UNITED STATES PATENT OFFICE.

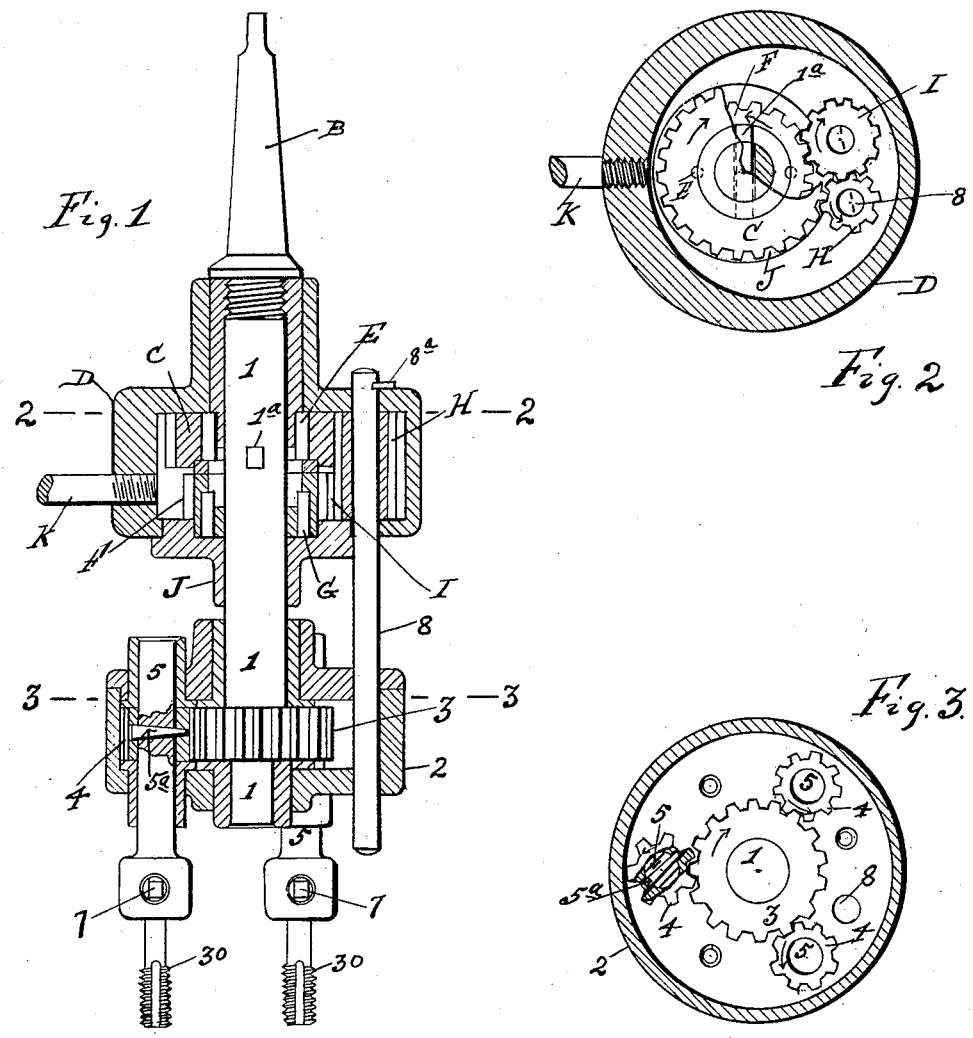

FRANKLIN ALFRED ERRINGTON, OF STAPLETON, NEW YORK.

MULTIPLE TAPPING DEVICE AND SIMILAR TOOL.

1,385,438.   Specification of Letters Patent.   Patented July 26, 1921.

Application filed November 20, 1919. Serial No. 339,313.

*To all whom it may concern:*

Be it known that I, FRANKLIN ALFRED ERRINGTON, a citizen of the United States, residing at Stapleton, in the county of Richmond and State of New York, have invented certain new and useful Improvements in Multiple Tapping Devices and Similar Tools, of which the following is a specification.

My invention relates broadly to multiple tapping devices for attachment either, directly to a one spindle reversible drill press; or preferably, indirectly, as shown, by interposing a reverse-gear mechanism between my multiple tap-holder and the spindle of a non-reversible drill press or similar machine; and the main object of my invention is to secure a simple, compact and powerful multiple tap-holder by, not only eliminating many of the parts that have heretofore characterized multiple drilling heads, but by reversing the direction of rotation of the drill press spindle. Under this novel mode of operation it will be obvious that, by directly connecting a supplementary spindle 1 to the reversible spindle of a drill press, many of the advantages of my invention would be obtained; but the slip-joint connection between a machine spindle and a cluster of taps 30, as well as other novel details of improvements and combinations of parts herein described, secure a more sensitive and practical functional effect in the type of device I have preferably illustrated in the accompanying drawings, and then pointed out in the claims.

Reference is to be had to the accompanying drawings, forming a part hereof, wherein:—Figure 1 represents a vertical cross-section of a device embodying my invention, the parts being shown in the driving position; Fig. 2 is a top plan view of the reversing mechanism, the case being shown in section on the line 2—2 of Fig. 1, and the internal mechanism in full lines, except where broken to illustrate more clearly the various connections between the several parts; Fig. 3 is a similar top plan view of the gear train of the multiple tap-holder. While I have preferably indicated by arrows on these plan views the direction of the rotation of the various gears during the driving operation of right hand tapping, yet my invention applies equally to left hand tapping, as well as to a multiplicity of similar operations.

Similar numerals and letters of reference indicate corresponding parts in the several views.

The reversing mechanism is preferably shown forming a slip-joint connection between a main driving-spindle or shank B and a multiple spindle head 2 carrying taps 30, whereby the main driving spindle B is provided with a driving-gear C journaled in a non-rotative case D, said driving-gear C having clutches E to engage a clutch-bar 1ª carried by a supplementary driven-spindle 1, to directly connect spindle 1 to rotate in the same direction as the main driving-spindle B when said clutches E and 1ª are thus engaged in the driving position. A reversing-gear F is preferably shown of smaller diameter than the driving-gear C, and is also provided with clutches G to alternately engage with the clutch-bar 1ª, when the spindle 1 moves longitudinally from the driving to the reversing position. A double depth transmitting pinion H is journaled in case D in such a position as the mesh with driving-gear C and also with a single depth reversing pinion I, which in turn also meshes with the reversing-gear F. By these, or any suitable reversing mechanism, it will be seen that when the clutches G of the reverse-gear F engage the clutch-bar 1ª, the spindle 1 will be rotated in the opposite direction to the rotation of the main driving-spindle B, and at an increased speed, owing to the difference shown in the diameters of the driving and reversing gears C and F. For convenience in assembling, the case D has been sub-divided by a cover J closing an aperture through which the internal parts are put in place. The case D is shown provided with a rod K, adapted to hold the case D from rotating with spindle B, and yet permit the free longitudinal movement of the reversing mechanism to or from the work in unison with the main driving-spindle B; and it will also be noted that the supplementary driven-spindle 1 is free to move axially along its bearings in case D, independently of the main driving-spindle B.

The outer end of the supplementary driven-spindle 1 is suitably journaled in a housing or case 2 and provided with a supplementary driven-gear 3, that meshes with a plurality of pinions 4, each shown suitably journaled in housing 2 and connected to rotate with its respective tap-holder 5 by a pin 5ª, or other permanent or constant means, by which each tool-holder 5 constantly turns in unison with its respective pinion 4, the rotation of the tool-holders 5 being in a direction constantly opposite to that of their supplementary driven spindle 1; whereas, the direction of rotation of spindle 1 is variable with relation to that of the main driving spindle B, according as the spindle 1 is temporarily connected with the driving clutches E, or with the reversing clutches G. Taps 30 are shown gripped to tap-holders 5 by set-screws 7. A reverse-rod 8 is adapted to prevent the rotation of housing 2.

When the supplementary driven-spindle 1 is in the driving position illustrated in Fig. 1, said spindle rotates in the same direction as the main driving spindle B; whereas, by reference to Fig. 3, it will be seen that, while the supplementary driven-gear 3 rotates in the same direction as the aforesaid spindles B and 1, yet the pinions 4 are thereby rotated in the opposite direction to the main driving spindle B; consequently, when employing right hand taps 30 in tap-holders 5, it will be necessary to rotate the main driving-spindle B left hand, which is a novel mode of operation by which the improved functional effect of my novel details of construction are secured.

The taps 30 having been driven into the work during the rotation of the parts as above described, the spindle B and its attached reverse-gear parts inclosed in case D are withdrawn from the work, and the clutch-bar 1ª brought into engagement with the clutches G of the reverse-gear, F, whereupon the direction of rotation of the spindle 1 will cause a corresponding reversal of direction of rotation of the gear 3 and pinions 4 of housing 2, and their respective tap-holders, thereby backing the taps 30 out of the work, with a quick-return.

Having now described my invention, what I claim is:—

1. The combination with a rotative spindle provided with a concentric gear and journaled in a non-rotative housing, of a plurality of pinions journaled in said housing and meshing with said gear, each of said pinions having an axially located tool-holder constantly connected thereto to turn in unison therewith in a direction constantly opposite to that of said spindle, substantially as described.

2. The combination with a main driving-spindle, of an axially located supplementary driven-spindle provided with a supplementary driven-gear journaled in a non-rotative housing, a plurality of pinions journaled in said housing and meshing with said supplementary driven-gear, each of said pinions having an axially located tool-holder connected to turn in unison therewith in a direction opposite to that of the main driving-spindle, and a slip-joint connection between said main driving-spindle and said tool-holders, substantially as described.

3. The combination with a main driving-spindle, of an axially located supplementary driven-spindle provided with a supplementary driven-gear journaled in a non-rotative housing, a plurality of pinions journaled in said housing and meshing with said driven-gear, each of said pinions having an axially located tool-holder connected to turn in unison therewith in a direction opposite to that of the main driving-spindle when said parts are in the driving-position, and means to reverse the direction of rotation of said supplementary driven-spindle to turn said tool-holders in the same direction of rotation as said main driving-spindle, substantially as described.

In testimony whereof I have hereunto signed my name, this 19th day of November 1919.

FRANKLIN ALFRED ERRINGTON.

Witnesses:
RAY A. HUGHES,
PAUL MARTIN.